(12) United States Patent
Kaihotsu

(10) Patent No.: US 8,602,581 B1
(45) Date of Patent: Dec. 10, 2013

(54) DISPLAY AND BACKLIGHT DEVICE

(71) Applicant: Takahisa Kaihotsu, Tokyo (JP)

(72) Inventor: Takahisa Kaihotsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/708,274

(22) Filed: Dec. 7, 2012

(30) Foreign Application Priority Data

Jul. 18, 2012 (JP) ................................. 2012-159665

(51) Int. Cl.
*G02F 1/13357* (2006.01)
(52) U.S. Cl.
USPC ........................................ 362/97.2; 362/97.1
(58) Field of Classification Search
USPC ................. 362/616, 97.1, 97.2, 97.3
See application file for complete search history.

(56) References Cited

U.S. PATENT DOCUMENTS

| | | | |
|---|---|---|---|
| 5,128,781 | A | 7/1992 | Ohno et al. |
| 7,413,334 | B2 | 8/2008 | Baba |
| 2002/0024803 | A1* | 2/2002 | Adachi et al. ............ 362/31 |
| 2005/0213320 | A1 | 9/2005 | Kazuhiro et al. |
| 2005/0243243 | A1 | 11/2005 | Koganezawa |
| 2006/0262564 | A1 | 11/2006 | Baba |
| 2007/0147089 | A1 | 6/2007 | Lin et al. |
| 2010/0315574 | A1 | 12/2010 | Mizuuchi et al. |
| 2012/0074873 | A1 | 3/2012 | Adachi et al. |

FOREIGN PATENT DOCUMENTS

| | | |
|---|---|---|
| EP | 2369373 | 9/2011 |
| EP | 2372416 | 10/2011 |
| EP | 2386885 | 11/2011 |
| EP | 2560035 | 2/2013 |
| JP | 2004-212830 | 7/2004 |
| JP | 2005-276794 | 10/2005 |
| JP | 2006-351522 | 12/2006 |
| JP | 2007-200885 | 8/2007 |

OTHER PUBLICATIONS

European Patent Application No./Patent No. 12196172.6-1903, Extended European Search Report, mailed Mar. 12, 2013.

* cited by examiner

*Primary Examiner* — David V Bruce
(74) *Attorney, Agent, or Firm* — Blakely, Sokoloff, Taylor & Zafman LLP

(57) ABSTRACT

According to one embodiment, a backlight device includes an optical controller, a light source, a first light guide module, a second light guide module, and a first member. The light source faces the optical controller. The first and second light guide modules are configured to guide light emitted by the light source toward the optical controller. The first member is placed in a traveling path of the light emitted by the light source. The first member is located near a joining portion at which the first light guide module and the second light guide module are joined to each other.

16 Claims, 16 Drawing Sheets

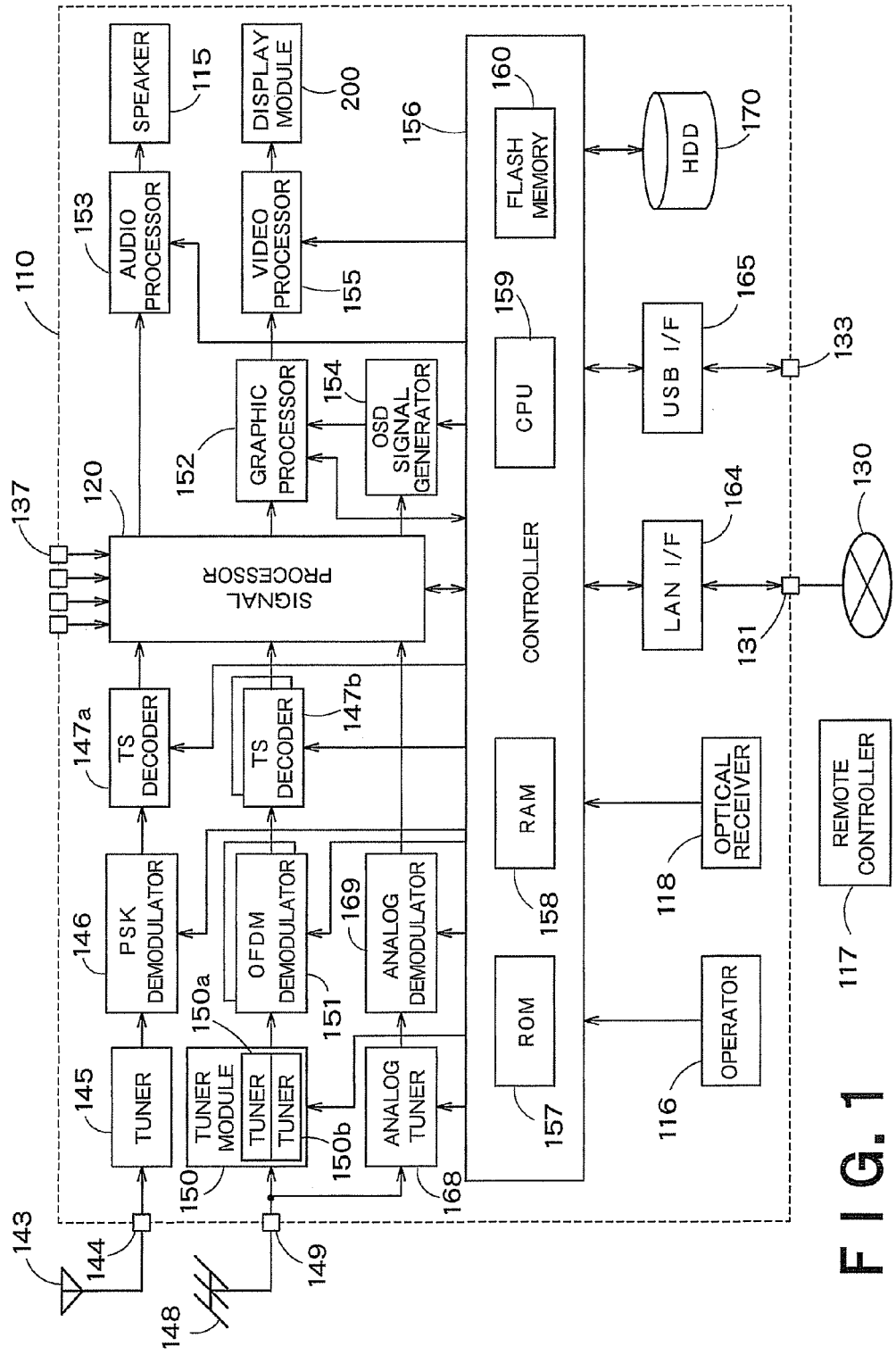
F I G. 1

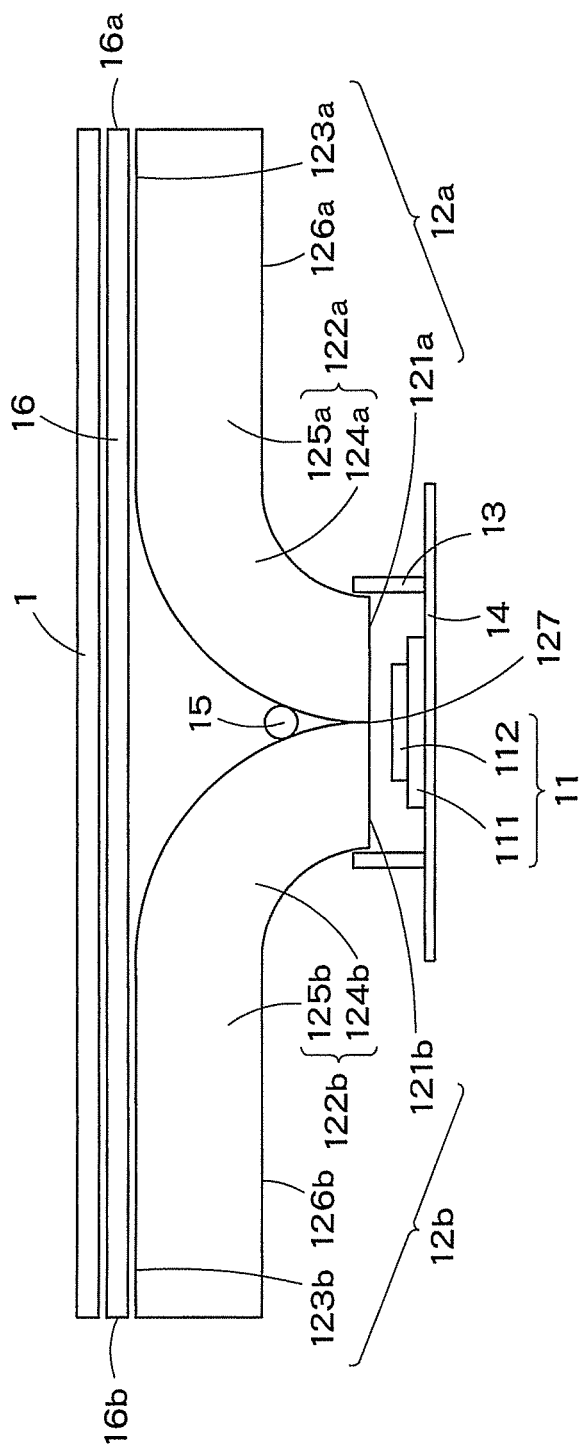
F I G. 5

F I G. 9A
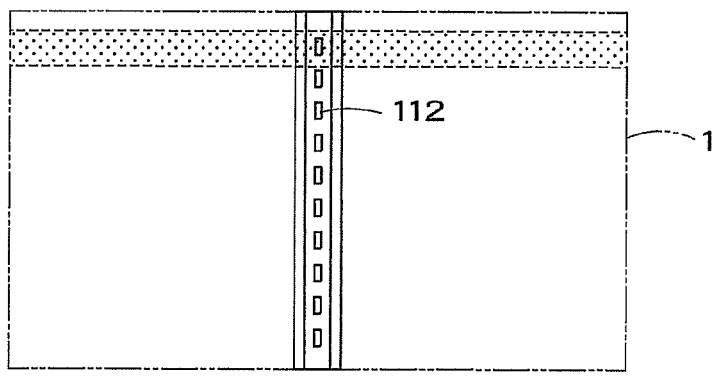
F I G. 9B
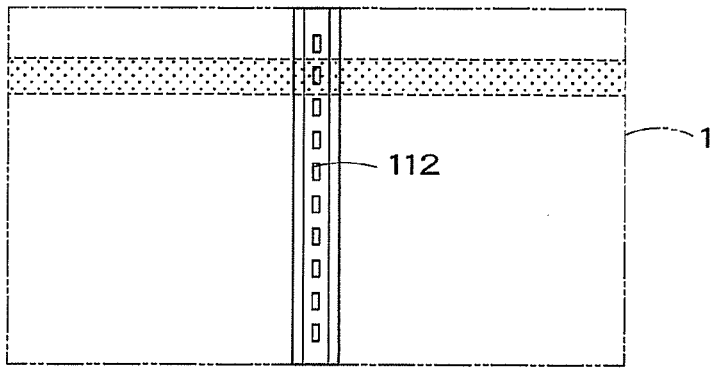
F I G. 9C
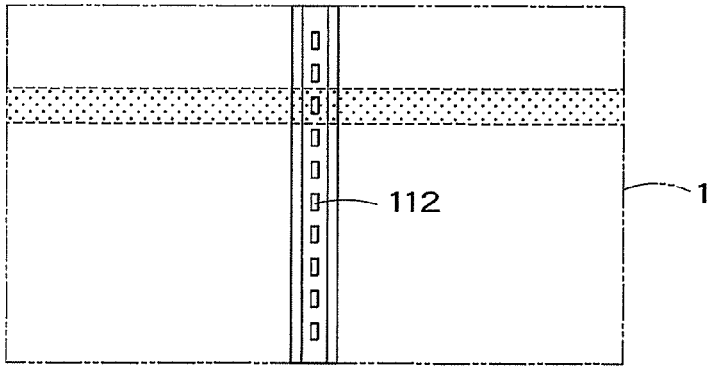
F I G. 9D
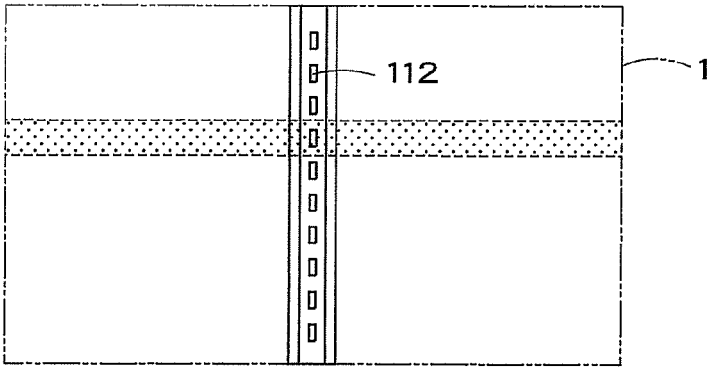

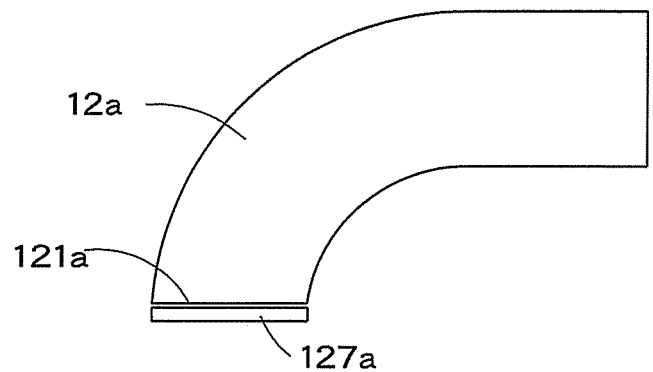
F I G. 13A
(b)
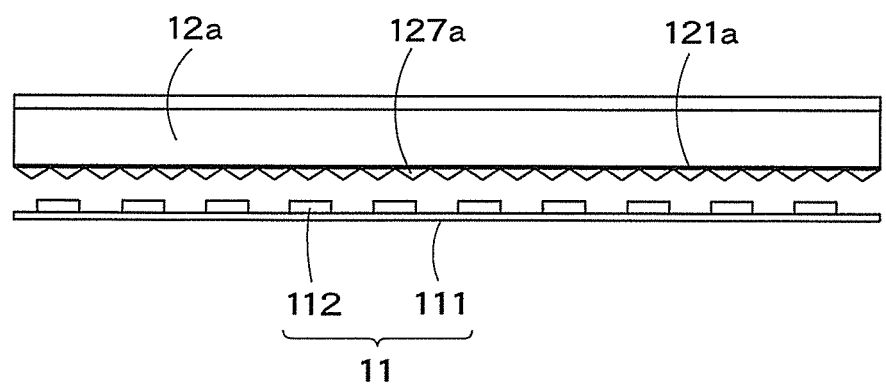
F I G. 13B

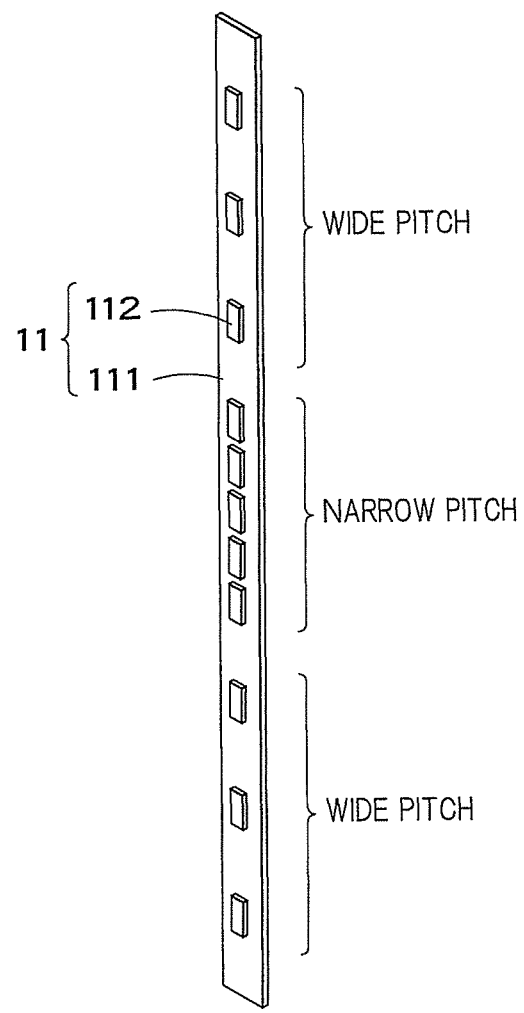
F I G. 14

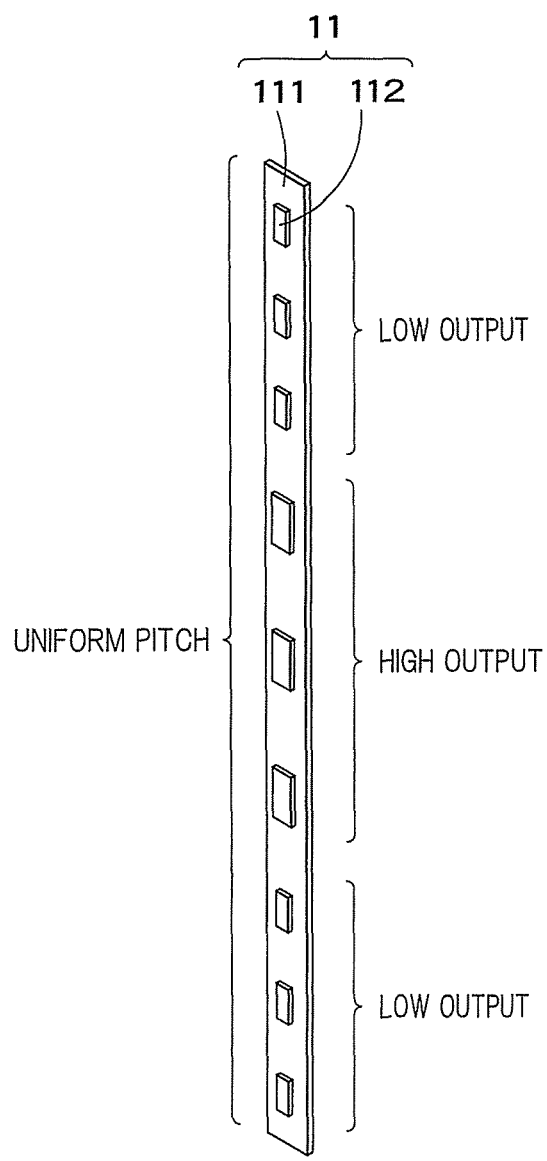
F I G. 15

DISPLAY AND BACKLIGHT DEVICE

CROSS REFERENCE TO RELATED APPLICATIONS

This application is based upon and claims the benefit of priority from the prior Japanese Patent Application No. 2012-159665, filed on Jul. 18, 2012, the entire contents of which are incorporated herein by reference.

FIELD

Embodiments described herein relate generally to a display and a backlight device.

BACKGROUND

In recent years, liquid crystal displays (LCDs) have been widely used. An LCD includes a liquid crystal panel formed by providing a liquid crystal material between a pair of glass substrates, and a backlight device that illuminates the liquid crystal panel with light from the back face of the liquid crystal panel. One kind of the backlight device is called "edge type".

The backlight device of edge type irradiates a side face of a light guide plate arranged at the back face of the liquid crystal panel from light sources such as light emitting diodes (LEDs), and widely diffused light is taken from a face of the light guide plate facing the liquid crystal panel. In these configurations, it is possible to make the backlight device thin. However, there is a problem that it is necessary to make the bezel width wide for arranging the light sources. Due to the wide bezel, the display area may appear small.

BRIEF DESCRIPTION OF THE DRAWINGS

FIG. 1 is a schematic block diagram of an image display system having an image display apparatus 110 according to one embodiment.

FIG. 5 is a front view of the liquid crystal panel 1 and the backlight device 6.

FIGS. 9A to 9D are diagrams for explaining backlight scanning.

FIGS. 13A and 13B are diagrams of a modified example of the light guide plate.

FIG. 14 is a diagram showing an example of an arrangement of the LED 112 on the LED bar 11.

FIG. 15 is a diagram showing an example of an arrangement of the LED 112 on the LED bar 11.

DETAILED DESCRIPTION

Figure 2:
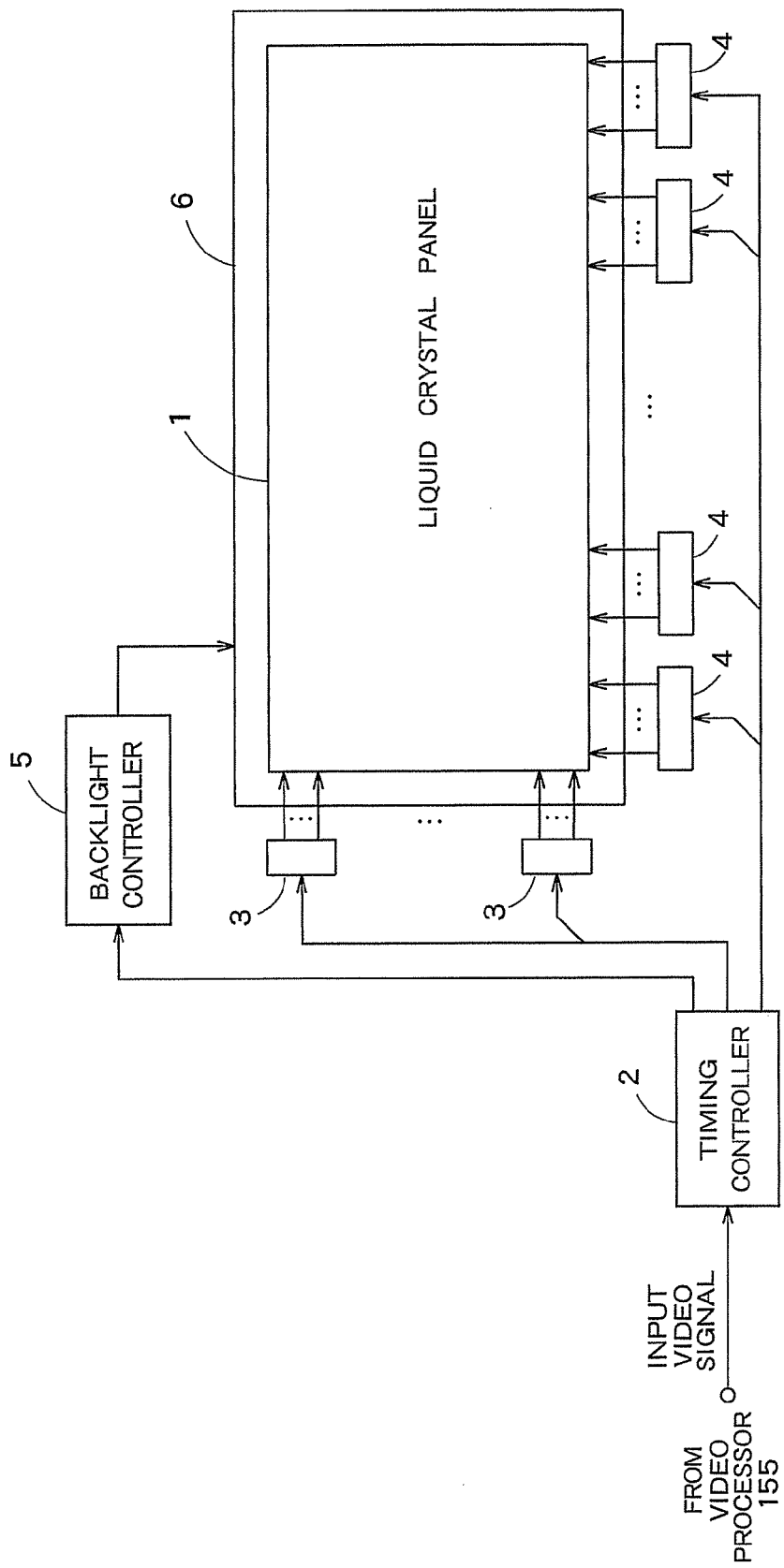
FIG. 2 is a schematic block diagram of the display module 200.

In general, according to one embodiment, a backlight device includes an optical controller, a light source, a first light guide module, a second light guide module, and a first member. The light source faces the optical controller. The first and second light guide modules are configured to guide light emitted by the light source toward the optical controller. The first member is placed in a traveling path of the light emitted by the light source. The first member is located near a joining portion at which the first light guide module and the second light guide module are joined to each other.

Embodiments will now be explained with reference to the accompanying drawings.

FIG. 1 is a schematic block diagram of an image display system having an image display apparatus 110 according to one embodiment.

The image display apparatus 110 has a controller 156 for controlling operations of each part, an operator 116, an optical receiver 118. The controller 156 has a ROM (Read Only Memory) 157, a RAM (Random Access Memory) 158, a CPU (Central Processing Unit) 159 and a flash memory 160.

The controller 156 activates a system control program and various processing programs stored in the ROM 157 in advance in accordance with an operation signal inputted from the operator 116 or inputted through the optical receiver 118 sent from the remote controller 117. The controller 156 controls the operations of each part according to the activated programs using the RAM 158 as a work memory of the CPU 159. Furthermore, the controller 156 stores and uses information and so on necessary for various settings in the flash memory 160 which is a non-volatile memory such as a NAND flash memory, for example.

The image display apparatus 110 further has an input terminal 144, a tuner 145, a PSK (Phase Shift Keying) demodulator 146, a TS (Transport Stream) decoder 147a and a signal processor 120.

The input terminal 144 sends a satellite digital television broadcasting signal received by an antenna 143 for receiving a BS/CS digital broadcast to the tuner 145 for the satellite digital broadcast. The tuner 145 tunes the received digital broadcasting signal to send the tuned digital broadcasting signal to the PSK demodulator 146. The PSK demodulator 146 demodulates the TS from the digital broadcasting signal to send the demodulated TS to the TS decoder 147a. The TS decoder 147a decodes the TS to a digital signal including a digital video signal, a digital audio signal and a data signal to send it to the signal processor 120.

Here, the digital video signal is a digital signal relating to a video which the image display apparatus 110 can output. The digital audio signal is a digital signal relating to an audio which the image display apparatus 110 can output. Furthermore, the data signal is a digital signal indicative of various kind of information about demodulated serves.

The image display apparatus 110 further has an input terminal 149, a tuner module having two tuners 150a and 150b, two OFDM (Orthogonal Frequency Division Multiplexing) demodulators 151, two TS decoders 147b, an analog tuner 168 and an analog demodulator 169.

The input terminal 149 sends a terrestrial digital television broadcasting signal received by an antenna 148 for receiving the terrestrial digital broadcast to the tuner 150 for the terrestrial digital broadcast. The tuners 150a and 150b in the tuner module 150 tune the received digital broadcasting signal to send the tuned digital broadcasting signal to the two OFDM demodulators 151, respectively. The OFDM demodulators 151 demodulate the TS from the digital broadcasting signal to send the demodulated TS to the corresponding TS decoder 147b. The TS decoder 147b decodes the TS to a digital video signal and a digital audio signal and so on to send them to the signal processor 120. The terrestrial digital television broadcast obtained by each of the tuners 150a and 150b in the tuner module 150 are decoded to the digital video signal, the digital audio signal and the digital signal including the data signal simultaneously by the two OFDM demodulators 151 and the TS decoders 147b, and then, can be sent to the signal processor 120.

The antenna 148 can also receive a terrestrial analog television broadcasting signal. The received terrestrial analog television broadcasting signal is divided by a divider (not shown) and sent to the analog tuner 168. The analog tuner 168 tunes the received analog broadcasting signal and sends the tuned analog broadcasting signal to the analog demodulator 169. The analog demodulator 169 demodulates the analog broadcasting signal to send the demodulated analog broadcasting signal to the signal processor 120. Furthermore, the image display apparatus 110 can display CATV (Common Antenna Television) by connecting a tuner for the CATV to the input terminal 149 connected to the antenna 148, for example.

The image display apparatus 110 further has a line input terminal 137, an audio processor 153, a speaker 115, a graphic processor 152, an OSD (On Screen Display) signal generator 154, a video processor 155 and a display 220.

The signal processor 120 performs a suitable signal processing on the digital signal sent from the TS decoders 147a and 147b or from the controller 156. More specifically, the signal processor 120 divides the digital signal into the digital video signal, the digital audio signal and the data signal. The digital video signal is sent to the graphic processor 152, and the divided digital audio signal is sent to the audio processor 153. Furthermore, the signal processor 120 converts the broadcasting signal sent from the analog demodulator 169 to a video signal and an audio signal in a predetermined digital format. The converted digital video signal is sent to the graphic processor 152, and the converted digital audio signal is sent to the audio processor 153. Furthermore, the signal processor 120 performs a digital signal processing on an input signal from the line input terminal 137.

The audio processor 153 converts the inputted audio signal to an analog audio signal in a format capable of being reproduced by the speaker 115. The analog audio signal is sent to the speaker 115 and is reproduced.

The OSD signal generator 154 generates an OSD signal for displaying an UI (User Interface) window or the like in accordance with a control of the controller 156. Furthermore, the data signal divided by the signal processor 120 from the digital broadcasting signal is converted to the OSD signal in a suitable format and is sent to the graphic processor 152.

The graphic processor 152 decodes the digital video signal sent from the signal processor 120. The decoded video signal is combined with the OSD signal sent from the OSD signal generator 154 and is sent to the video processor 155. The graphic processor 152 can send the decoded video signal or the OSD signal selectively to the video processor 155.

The video processor 155 converts the signal sent from the graphic processor 152 to an analog video signal in a format the display module 200 can display. The analog video signal is sent to the display module 200 to be displayed. The display module 200 is, for example, a crystal liquid display having a size of "12" inch or "20" inch.

The image display apparatus 110 further has a LAN (Local Area Network) terminal 131, a LAN I/F (Interface) 164, a USB (Universal Serial Bus) terminal 133, a USB I/F 165 and a HDD (Hard Disk Drive) 170.

The LAN terminal 131 is connected to the controller 156 through the LAN I/F 164. The LAN terminal 131 is used as a general LAN-corresponding port using an Ethernet (registered trademark). In the present embodiment, a LAN cable is connected to the LAN terminal 131, and it is possible to communicate with an internet 130.

The USB terminal 133 is connected to the controller 156 through the USB I/F 165. The USB terminal 133 is used as a general USB-corresponding port. For example, a cellular phone, a digital camera, a card reader/writer for various memory cards, a HDD and a key board or the like can be connected to the USB terminal 133 through a hub. The controller 156 can communicate with devices connected through the USB terminal 133.

The HDD 170 is a magnetic storage medium in the image display apparatus 110, and has a function for storing various information of the image display apparatus 110.

FIG. 2 is a schematic block diagram of the display module 200. The display module 200 has a liquid crystal panel (display panel) 1, a timing controller 2, a gate driver 3, a source driver 4, a backlight controller 5, and a backlight module 6.

The liquid crystal panel 1 has a structure where liquid crystal materials are put between a pair of facing glass substrates. The liquid crystal panel 1 has a plurality of (for example, "1080" of) scanning lines, a plurality of (for example, "1920*3" of) signal lines, and a plurality of liquid crystal pixels formed on each of crossing points of the scanning lines and the signal line.

The timing controller 2 provides the input video signal inputted from the video processor 155 of FIG. 1 to the source driver 4 and controls the operation timing of the gate driver 3, source driver 4 and backlight controller 5.

The gate driver 3 selects one of the scanning lines by turns. The source driver 4 provides the input video signal to the signal lines of the liquid crystal panel 1. The input video signal is provided to the liquid crystal pixel connected to the scanning line selected by the gate driver 3. According to the voltage of the supplied input video signal, alignments of the liquid crystal materials in the liquid crystal pixel vary. The gate driver 3 and the source driver 4 form a panel controller.

On the other hand, the backlight module 6 is arranged behind the liquid crystal panel 1 to irradiate light thereon. Among the irradiated light, light whose intensity depends on the alignments of the liquid crystal materials, is transmissive to the liquid crystal materials to be displayed on the liquid crystal panel 1.

Figure 3:
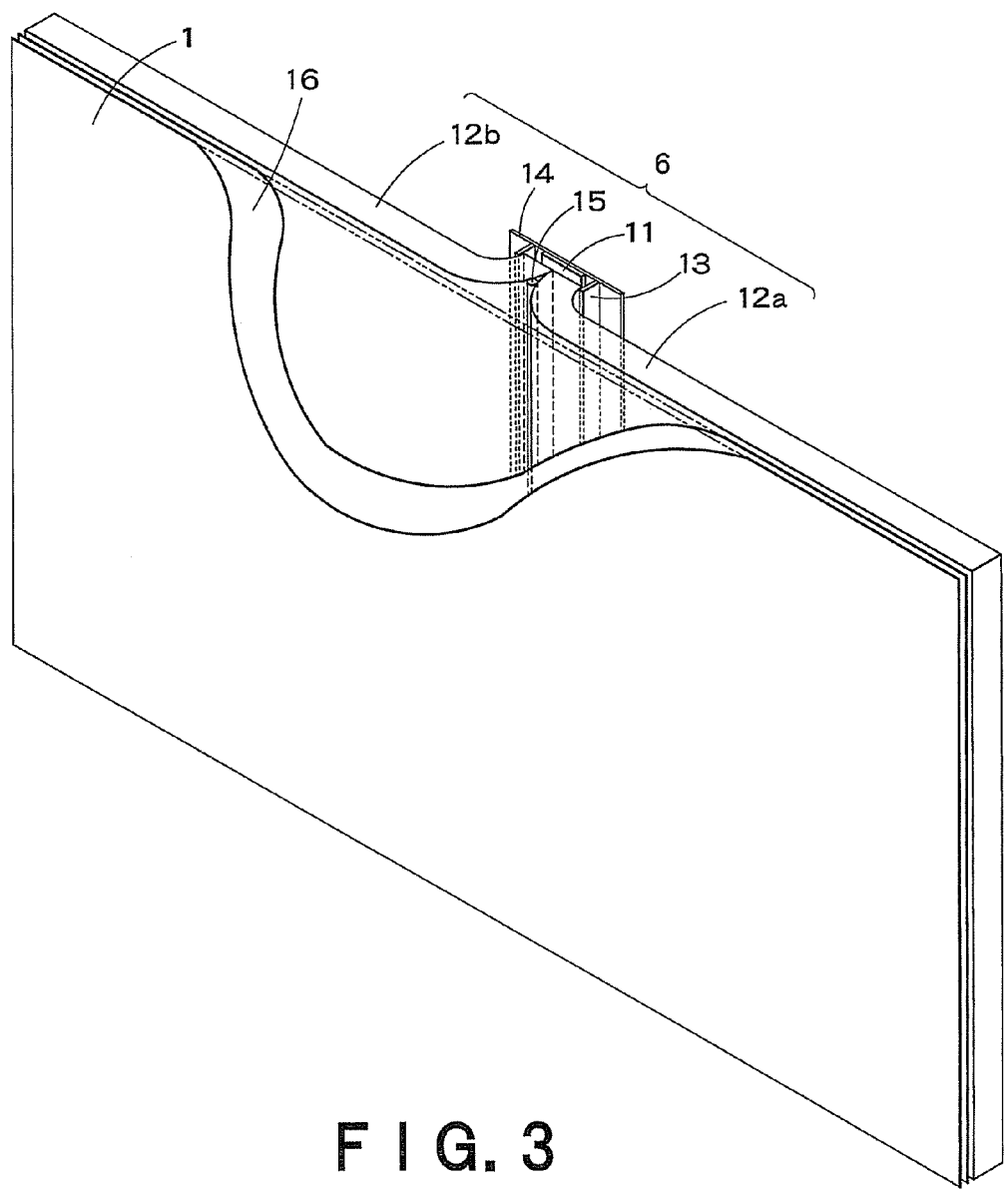
FIG. 3 is a perspective view of the liquid crystal panel 1 and the backlight device 6.
Figure 4:
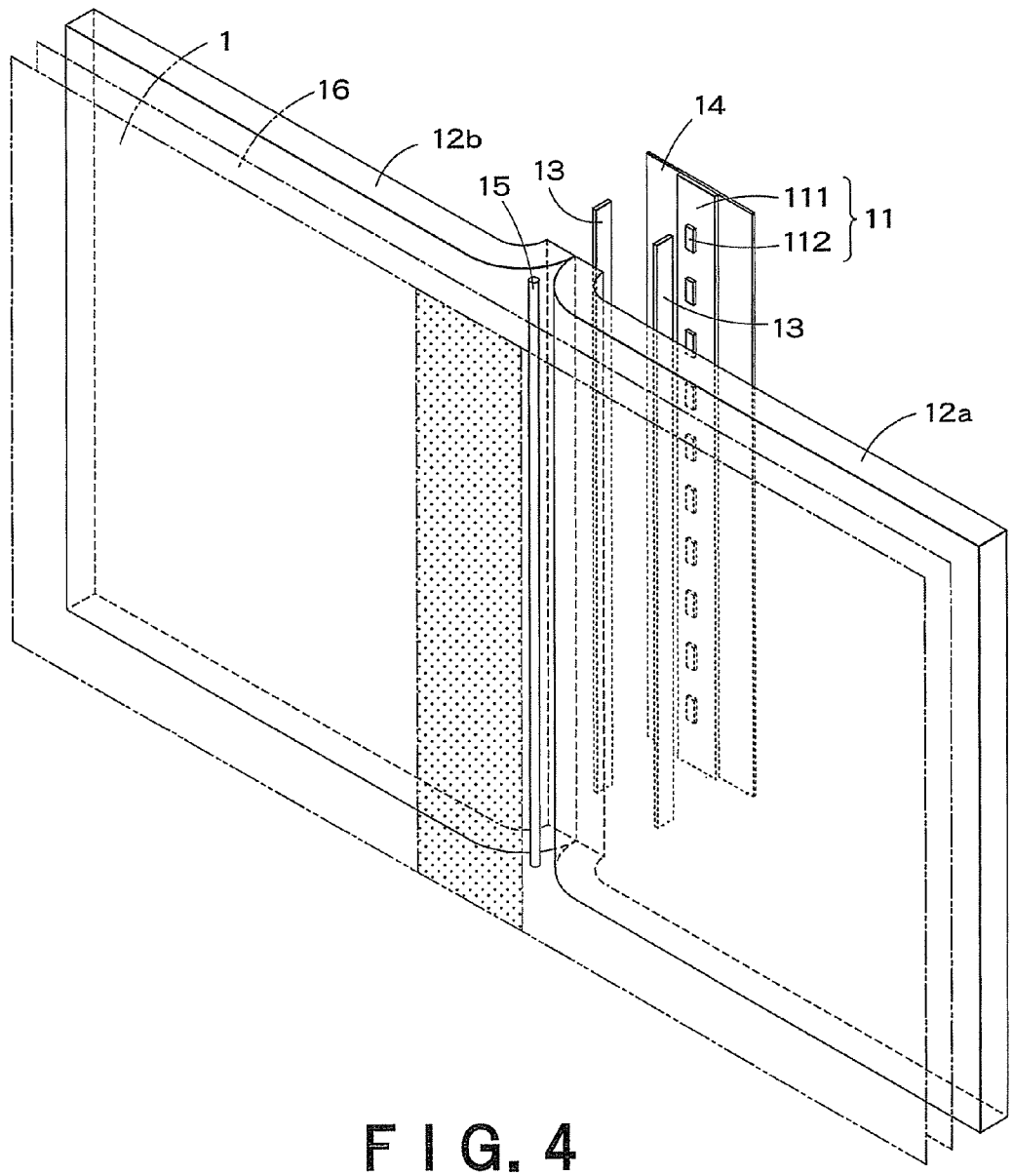
FIG. 4 is an exploded view of the liquid crystal panel 1 and the backlight device 6 shown in FIG. 3.

FIG. 3 is a perspective view of the liquid crystal panel 1 and the backlight device 6. FIG. 4 is an exploded view of the liquid crystal panel 1 and the backlight device 6 shown in FIG. 3. FIG. 5 is a front view of the liquid crystal panel 1 and the backlight device 6. In the following, the direction from the backlight device 6 toward the liquid crystal panel 1 will be referred to as the upward direction, for convenience sake. Further, the longitudinal direction of the liquid crystal panel 1 is defined as the horizontal direction, and the short-side direction of the liquid crystal panel 1 is defined as the vertical direction. Further, the spotted region in FIG. 4, that is, a region on the display surface of the liquid crystal panel 1, including the center of the liquid crystal panel 1, having a predetermined width in the horizontal direction, and extending in the vertical direction, will be referred to as a "center region" of the liquid crystal panel 1.

The backlight device 6 includes an LED bar 11, light guide plates (a first light guide module 12a and a second light guide module 12b), holders 13, a frame 14, a light shielding packing (a first member) 15, and an optical sheet (an optical controller) 16. Firstly, the structures of the respective components will be described.

The LED bar 11 is formed by arranging LEDs (light sources) 112 on a substrate 111 facing the optical sheet (the optical controller) 16. More specifically, the substrate 111 is located below the center region of the liquid crystal panel 1. The shape of the substrate 111 is rectangular, for example, and the center line thereof is located immediately below the center line in the vertical direction of the liquid crystal panel 1. The LEDs 112 are aligned with predetermined intervals along the center line of the substrate 111. Each of the LEDs 112 emits white light upwardly. Most of the emitted light enters the light guide plates (the first light guide module 12a and the second light guide module 12b), but there is light leaking through the space between the light guide plates (the first light guide module 12a and the second light guide module 12b) toward the liquid crystal panel 1.

The LEDs 112 are located below the liquid crystal panel 1, instead of on the sides of the liquid crystal panel 1. Accordingly, the bezel of the image display apparatus 110 can be made thinner. The LEDs 112 are not arranged in two lines in conformity with the two light guide plates (the first light guide module 12a and the second light guide module 12b). Instead, the LEDs 112 are arranged in one line between the light guide plates (the first light guide module 12a and the second light guide module 12b). Accordingly, the number of LEDs 112 can be reduced.

The light guide plates (the first light guide module 12a and the second light guide module 12b) are made of a transparent resin such as acrylic, and are formed by mold injection. Since the light guide plates (the first light guide module 12a and the second light guide module 12b) have the same structures as each other, only the light guide plate 12a will be described below. As shown in FIG. 5, the light guide plate 12a is formed with a light entering face 121a, a light guide path 122a, and a light exiting face 123a. Part of the light entering face 121a faces the LEDs 112, and part of the light emitted by the LEDs 112 enters the light entering face 121a. The light guide path 122a is formed by integrating a curved portion (a light pipe) 124a having a cross-section that approximates an arc having a center angle of about 90 degrees, and a flat portion 125a. The face at one end of the curved portion 124a is the light entering face 121a, and the face at the other end is shared with the flat portion 125a.

The upper face of the light guide path 122a is the light exiting face 123a. Scattering marks (scattering portions) 126a are formed at some portions of the lower face of the light guide path 122a. For example, the white scattering marks 126a are formed at the curved portion 124a by pad printing, and at the flat portion 125a by serigraph. Instead of the scattering marks 126a, a concave and convex pattern (a "shibo pattern" or texturing) may be formed at the time of formation of the light guide plate 12a, so as to scatter light.

The holders 13 sandwich and secure the curved portions 124a and 124b of the light guide plates (the first light guide module 12a and the second light guide module 12b). More specifically, the holders 13 secure the light guide plates (the first light guide module 12a and the second light guide module 12b) so that the space between the light entering face 121a of the light guide plate 12a and the light entering face 121b of the light guide plate 12b is minimized, and a joining portions 127 of both light guide plates are located above the center line of the LED bar 11 in the drawing.

As the light guide plates 12a and 12b are secured in this manner, the light emitted by the LEDs 112 is made to evenly enter the light guide plate 12a and the light guide plate 12b. Since the locations of the light entering faces 121a and 121b need to be adjusted with high precision, the curved portions 124a and 124b of the light guide plates (the first light guide module 12a and the second light guide module 12b) are firmly secured by the holders 13. Meanwhile, the flat portions 125a and 125b are loosely attached to the back panel (not shown) of the image display apparatus 110 by using grooves or pins, so that thermal expansion of the light guide plates (the first light guide module 12a and the second light guide module 12b) can be absorbed at the flat portions 125a and 125b.

The LED bar 11 and the holders 13 are placed on the frame 14. That is, the LED bar 11 is placed at the center of the frame 14, and the holders 13 that sandwich the curved portions 124a and 124b of the light guide plates (the first light guide module 12a and the second light guide module 12b) are placed at both ends of the LED bar 11. The frame 14 may be secured to the back panel for heat release.

The light shielding packing (the first member) 15 is a light shielding member having a cylindrical shape made of rubber, and the diameter of the light shielding packing 15 is 1 mm or smaller, for example. The light shielding packing (the first member) 15 is placed between the curved portion 124a of the light guide plate 12a and the curved portion 124b of the light guide plate 12b, in other words, between the optical sheet (the optical controller) 16 and the joining portions 127 of the light entering face 121a and the light entering face 121b. The light shielding packing (the first member) 15 is designed to fill the space formed between the joining portions 127 of the light entering face 121a and the light entering face 121b.

That is, the light shielding packing (the first member) 15 is placed in a traveling path of the light emitted by the light sources, and near the joining portions 127 at which the light guide plates (the first light guide module 12a and the second light guide module 12b) are joined to each other, as shown in the drawing.

The light shielding packing (the first member) 15 restrains the light emitted by the LEDs 112 from leaking through the space between the light entering face 121a of the light guide plate 12a and the light entering face 121b of the light guide plate 12b to reach the liquid crystal panel 1, without passing through the light guide plates (the first light guide module 12a and the second light guide module 12b).

The light shielding packing (the first member) 15 may be in the form of a rubber band. In that case, the backlight device 6 may be put through the band, so that the band holds the backlight device 6 at the space portion between the curved portions 124a and 124b and at the bottom portion of the frame 14. Alternatively, when the space between the curved portions 124a and the 124b is extremely narrow, the space may be filled with an optical caulking material as a light shielding portion.

The optical sheet (the optical controller) 16 according to this embodiment will be now described.

Figure 6:
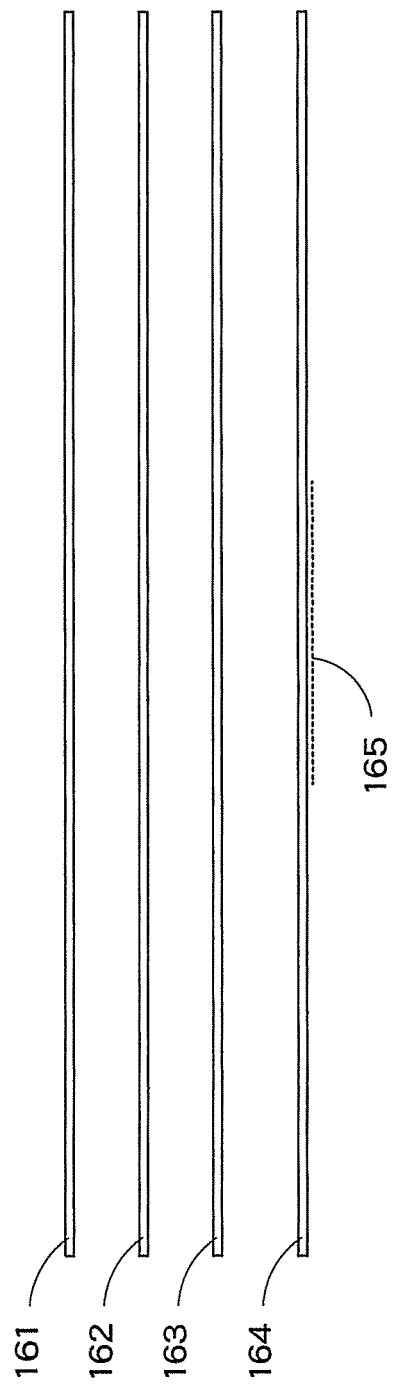
FIG. 6 is a cross-sectional view showing an example structure of the optical sheet (the optical controller) 16.

The optical sheet (the optical controller) 16 is also called an OCP (Optical Control Plate), and is placed between the liquid crystal panel 1 and the light guide plates (the first light guide module 12a and the second light guide module 12b). FIG. 6 is a cross-sectional view showing an example structure of the optical sheet (the optical controller) 16.

In this example, the optical sheet (the optical controller) 16 includes a diffusion sheet 161, a horizontal prism sheet 162, a vertical prism sheet 163, and a luminance control sheet 164 in this order when viewed from the liquid crystal panel 1. A reflection pattern 165 is formed near the center of the luminance control sheet 164 by serigraphing a white ink having a high reflectivity. By forming the reflection pattern 165, the intensity of light reaching the liquid crystal panel 1 can be controlled, and illuminance unevenness on the liquid crystal panel 1 can be reduced.

In this embodiment, the luminance control sheet 164 may not be provided, and the reflection pattern 165 may be printed on the diffusion sheet 161, so as to lower the costs.

Although not shown in FIG. 3 and other drawings, a reflection sheet may be placed between the back panel and the light guide plates (the first light guide module 12a and the second light guide module 12b). With this arrangement, the light leaking from the light guide plates (the first light guide module 12a and the second light guide module 12b) toward the back panel is reflected back into the light guide plates (the first light guide module 12a and the second light guide module 12b), and thus, the light use efficiency can be made higher.

Figure 7:
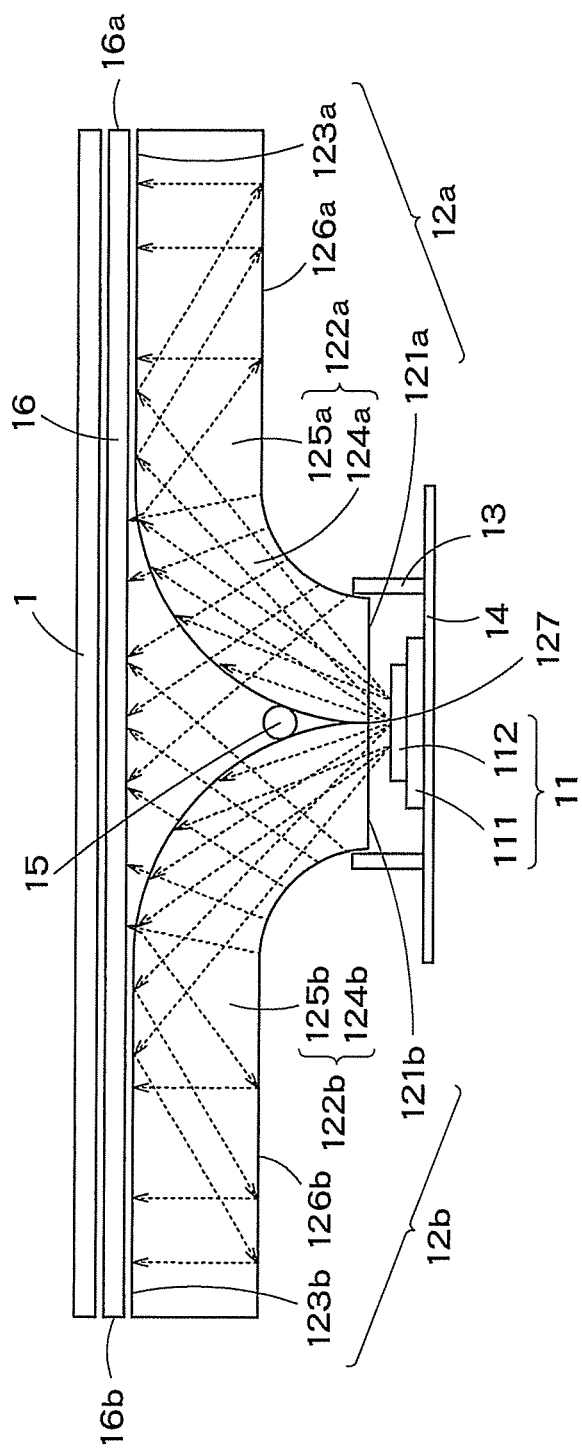
FIG. 7 is a diagram for explaining the ray paths of the light emitted by the LEDs 112.

Next, the ray paths in the backlight device 6 will be described. FIG. 7 is a diagram for explaining the ray paths of the light emitted by the LEDs 112.

The light emitted by the LEDs 112 almost evenly enters the light entering faces 121a and 121b of the light guide plates (the first light guide module 12a and the second light guide module 12b). The light horizontally spreads from a portion located below the center portion of the optical sheet (the optical controller) 16 (and the liquid crystal panel 1) toward the right-side rim (16a) via the light guide path 122a, and the light also horizontally spreads from the portion located below the center region of the optical sheet (the optical controller) 16 (and the liquid crystal panel 1) toward the left-side rim (16b) via the light guide path 122b.

Part of the light that has entered the light guide plates (the first light guide module 12a and the second light guide module 12b) is scattered by the scattering marks 126a and 126b formed at the curved portions 124a and 124b, and exits from the light exiting faces 123a and 123b at the curved portions 124a and 124b.

The light that has exited from the light exiting faces 123a and 123b illuminates portions located above the curved portions 124a and 124b and the light shielding packing (the first member) 15, that is, portions located near the center regions of the optical sheet (the optical controller) 16 and the liquid crystal panel 1.

The light exiting from the curved portions 124a and 124b might not be even, but the luminance unevenness can be reduced by the luminance control sheet 164 in the optical sheet (the optical controller) 16.

Other part of the light that has entered the light guide plates (the first light guide module 12a and the second light guide module 12b) is deflected along the liquid crystal panel 1 toward the left and right rims of the curved portions 124a and 124b by the curved portions 124a and 124b, and enters the flat portions 125a and 125b.

The light is then scattered by the scattering marks 126a and 126b at the flat portions 125a and 125b, and exits from the light exiting faces 123a and 123b at the flat portions 125a and 125b. The exited light illuminates portions located above the flat portions 125a and 125b, or portions located closer to the rims 16a and 16b extending along the short sides of the optical sheet (the optical controller) 16 and the liquid crystal panel 1.

Also, the intensity of the light reaching the liquid crystal panel 1 can be controlled by adjusting the size and density of the scattering marks 126a and 126b, for example. The control can be performed so that the luminance becomes uniform in the entire liquid crystal panel 1, or the luminance becomes higher in the center region and becomes gradually lower toward the peripheral portions, for example.

Here, the light guide plates (the first light guide module 12a and the second light guide module 12b) are designed to be secured by the holders 13 so that the space between the light entering face 121a and the light entering face 121b is minimized. However, there is a possibility that a very small space is formed during the manufacture or shipping.

Since the LEDs 112 are placed immediately below the space, the light emitted by the LEDs 112 might leak through the space, even if the space is extremely small.

Figure 8A:
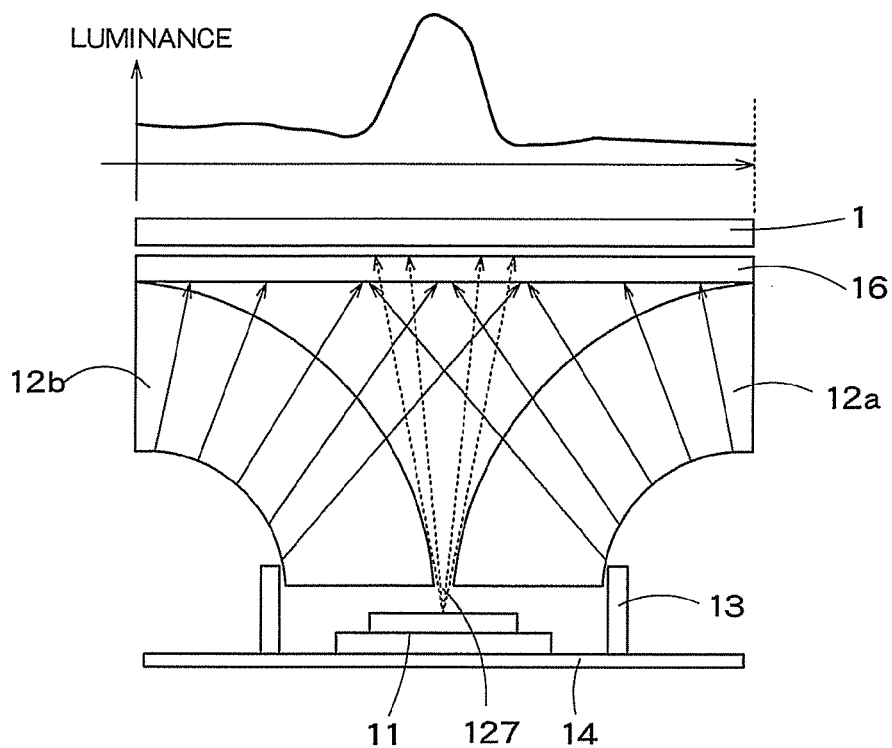
FIGS. 8A and 8B are diagrams showing intensity of light emitted to the liquid crystal panel 1.

In a case where the light shielding packing (the first member) 15 is not provided, for example, there is a possibility that the light reaches the liquid crystal panel 1, and straight emission lines appear in the liquid crystal panel 1, as shown in FIG. 8A.

In such a case, the emission lines might be clearly recognized by the human eye, as those emission lines have a high luminance peak even if the widths are small. Also, the emission lines are not easily reduced by the luminance control sheet 164.

To counter this problem, the light shielding packing (the first member) 15 is provided in a traveling path of the light emitted by the light sources, for example, and near the joining portions at which the first light guide module and the second light guide module are joined to each other in this embodiment. With this arrangement, emission lines can be reduced.

That is, the light that has been emitted by the LEDs 112 and has passed through the space between the light entering face 121a and the light entering face 121b reaches the light shielding packing (the first member) 15, and is reflected by the light shielding packing 15, for example.

Figure 8B:
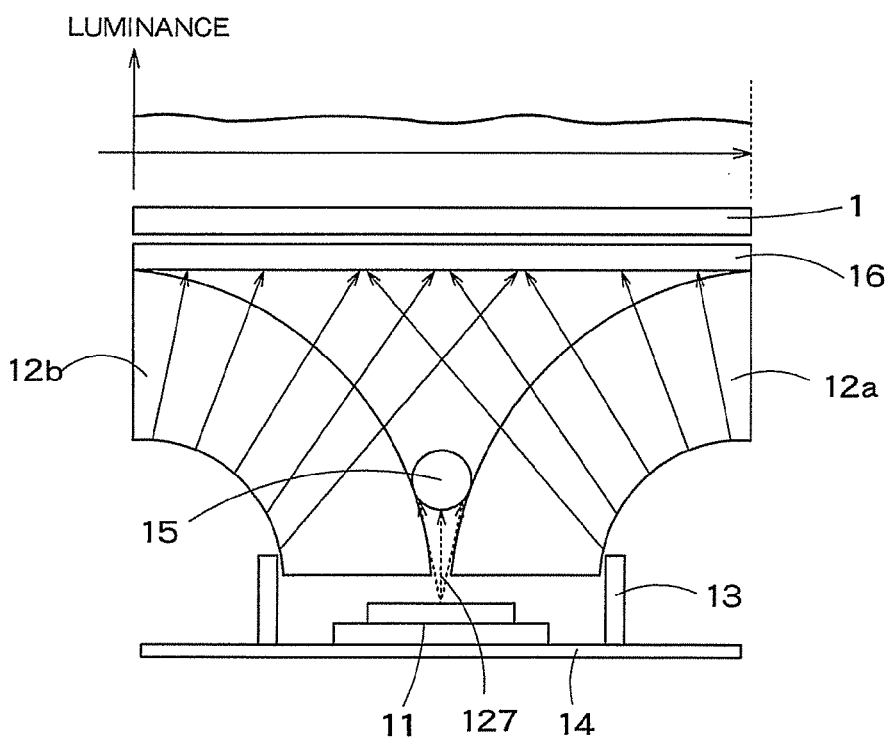

Accordingly, the light emitted by the LEDs 112 can be prevented from directly reaching the liquid crystal panel 1, as shown in FIG. 8B.

When the diameter of the light shielding packing (the first member) 15 is sufficiently small, for example, the optical system is hardly affected, and shading rarely occurs on the liquid crystal panel 1.

Part of the light reflected by the light shielding packing (the first member) 15 travels to the light guide plates (the first light guide module 12a and the second light guide module 12b), passes through the light guide paths 122a and 122b, and exits from the light exiting faces 123a and 123b toward the liquid crystal panel 1.

Therefore, so as to prevent a color shift between the light that is reflected by the light shielding packing (the first member) 15 before reaching the liquid crystal panel 1 and the light that is not reflected by the light shielding packing (the first member) 15 before reaching the liquid crystal panel 1, it is preferable to paint the surface of the light shielding packing (the first member) 15 with a white ink that is the same as the ink used in the scattering mark printing, for example.

In a case where the light guide plates (the first light guide module 12a and the second light guide module 12b) are molded as one component, and light from the LEDs 112 does not leak to the liquid crystal panel 1, the light shielding packing (the first member) 15 may not be provided.

By using the backlight device 6 of this embodiment, backlight scanning can be efficiently performed. Backlight scanning is a control not to emit light to the region that switches display images on the liquid crystal panel 1 from the backlight device 6. By performing the backlight scanning, afterimages can be reduced, by which higher image quality can be achieved.

Figure 10:
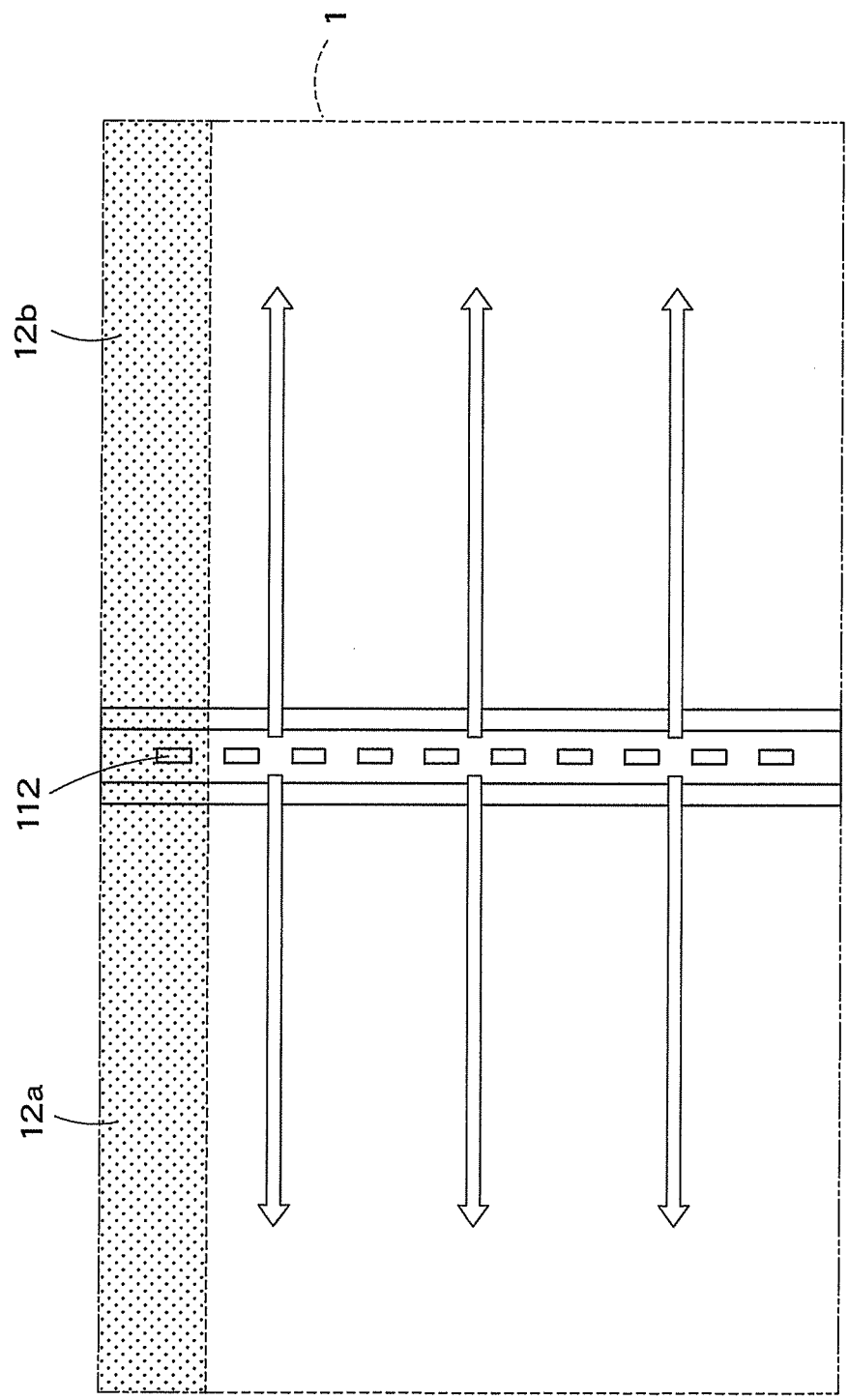
FIG. 10 is a diagram for explaining backlight scanning.

FIGS. 9 and 10 are diagrams showing a situation where backlight scanning is performed. While the gate driver 3 of FIG. 2 selects and rewrites a line in an upper portion of the liquid crystal panel 1, the backlight controller 5 turns off the uppermost LED 112, and causes the other LEDs 112 to emit light (FIG. 9A).

While the gate driver 3 selects and rewrites a line in a slightly lower portion than the previously selected line of the liquid crystal panel 1, the backlight controller 5 turns off the second LED 112 from the top, and causes the other LEDs 112 to emit light (FIG. 9B).

As the backlight controller 5 sequentially switches the LEDs 112 to emit light in the above manner (FIGS. 9A through 9D), backlight scanning can be performed.

The LEDs 112 to emit light may be switched one by one, or may be switched by the four, for example.

If LEDs are arranged along a horizontal rim of a liquid crystal panel and are placed above (or below) the liquid crystal panel, backlight scanning in the horizontal direction cannot be performed. If LEDs are arranged along a vertical rim of a liquid crystal panel and are placed only on the left side (or the right side) of the liquid crystal panel, light propagates in the longitudinal direction of the liquid crystal panel, and loss in the light guide plates becomes larger. As a result, the number of LEDs needs to be increased, resulting in higher costs.

In this embodiment, on the other hand, the LEDs 112 are arranged in the vertical direction, as shown in FIG. 10. Accordingly, backlight scanning can be easily performed. Furthermore, the LEDs 112 are positioned to face the center region of the liquid crystal panel 1. As light propagates from the center to the left and right of the liquid crystal panel 1, the light propagation lengths become shorter, and the loss can be made smaller.

As described above, the LEDs 112 are arranged not on the back face of the liquid crystal panel 1 but below the liquid crystal panel 1 in this embodiment. Accordingly, the bezel width of the backlight device 6 can be made smaller. Also, the LEDs 112 are arranged in one line between the light entering faces 121a and 121b of the light guide plates (the first light guide module 12a and the second light guide module 12b). Accordingly, the required number of LEDs 112 can be made smaller. Further, the light shielding packing (the first member) 15 is placed between the light guide paths 122a and 122b. Accordingly, the light emitted by the LEDs 112 can be prevented from reaching the liquid crystal panel 1 without passing through the light guide plates (the first light guide module 12a and the second light guide module 12b). As a result, luminance unevenness in the liquid crystal panel 1 can be reduced.

In the following, several modifications will be described. The light shielding packing 15 may not be cylindrical but may be a triangular prism or a quadrangular prism.

The LEDs 112 may not necessarily be arranged in one line on the substrate 111.

Figure 11C:
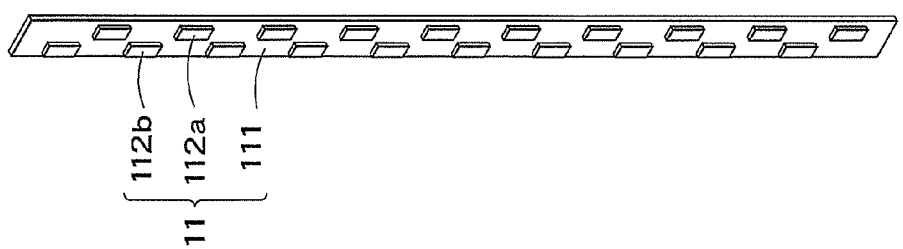
FIGS. 11A to 11C are diagrams showing examples in which the LEDs 112 are arranged in the LED bar 11.
Figure 11B:
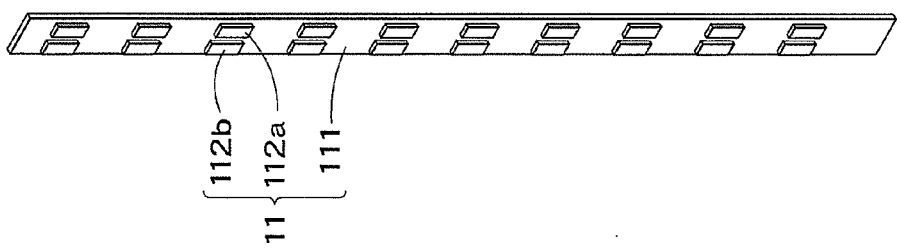
Figure 11A:
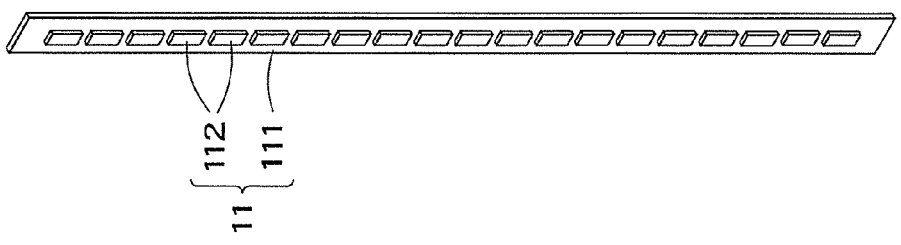

FIGS. 11A to 11C are diagrams showing examples in which the LEDs 112 are arranged in the LED bar 11. FIG. 11A shows an example in which the LEDs 112 are arranged in one line as described in the above embodiment. In this case, the LEDs 112 are arranged in the vertical direction so that the joining portions of the light entering faces 121a and 121b of the light guide plates (the first light guide module 12a and the second light guide module 12b) are located immediately above the center line of each of the LEDs 112. The light emitted by the LEDs 112 substantially evenly enters the light guide plate 12a and the light guide plate 12b.

LEDs may also be arranged in two lines, as shown in FIGS. 11B and 11C. In this case, LEDs 112a in a first line face the light entering face 121a of the light guide plate 12a, and are arranged so that the center line of the light entering face 121a is located immediately above the center line of each of the LEDs 112a.

Meanwhile, LEDs 112b in a second line face the light entering face 121b of the light guide plate 12b, and are arranged so that the center line of the light entering face 121b is located immediately above the center line of each of the LEDs 112b. The LEDs 112a in the first line may be parallel to the LEDs 112b in the second line as shown in FIG. 11B, or the LEDs 112a in the first line and the LEDs 112b in the second line may be arranged in a zigzag or staggered manner as shown in FIG. 11C.

In the example illustrated in FIG. 11C, the odd-numbered (counted from the top) LEDs 112b are arranged to face the light guide plate 12b on the left side, and the even-numbered LEDs 112a are arranged to face the light guide plate 12a on the right side.

In the examples illustrated in FIGS. 11B and 11C, the light emitted by the LEDs 112a in the first line enters the right-side light guide plate 12a at maximum efficiency, and part of the light also enters the left-side light guide plate 12b. Likewise, the light emitted by the LEDs 112b in the second line enters the left-side light guide plate 12b at maximum efficiency, and part of the light also enters the right-side light guide plate 12a. Accordingly, the efficiency of light incident on each light guide plate can be increased.

Figure 12:
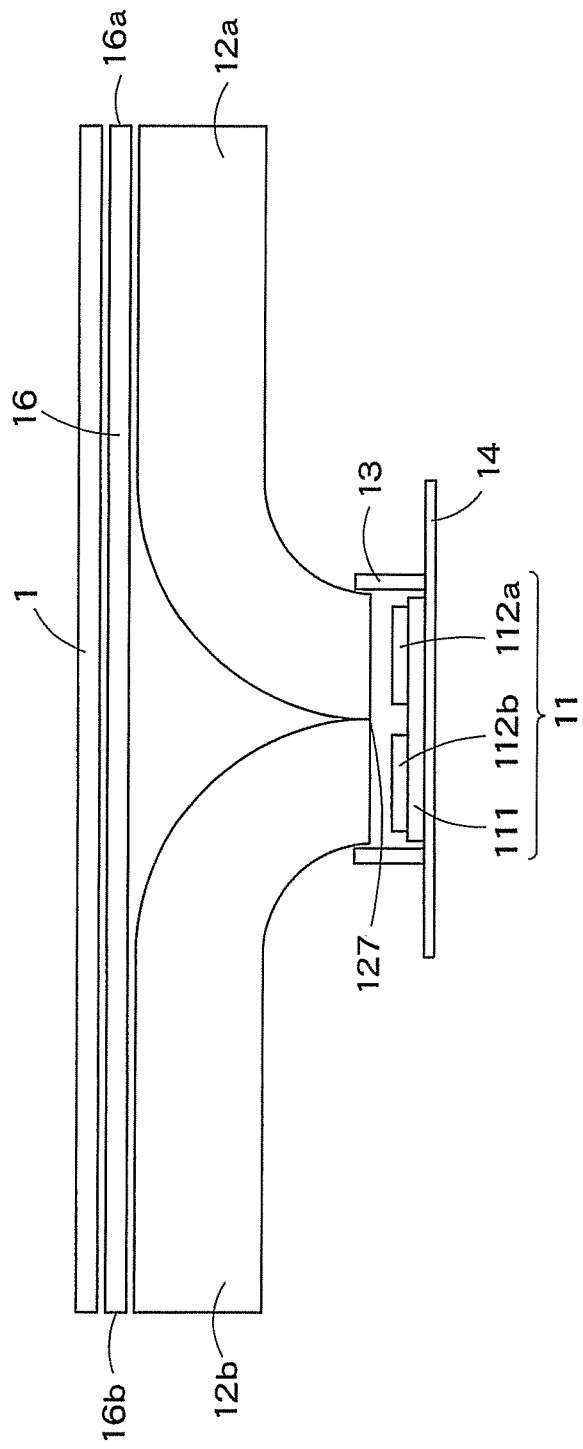
FIG. 12 is a front view of a modified example of FIG. 5.

In the cases where the LEDs 112 are arranged in two lines, the LEDs 112 are not located immediately below the space between the light entering face 121a of the light guide plate 12a and the light entering face 121b of the light guide plate 12b. Accordingly, luminance unevenness hardly appears on the liquid crystal panel 1, even if the light shielding packing is not provided as shown in FIG. 12.

Either in a case where the LEDs 112 are arranged in a line or in a case where the LEDs 112 are arranged in two lines, a reduction of the number of LEDs 112 is considered, so as to lower the costs. However, if the pitch of the LEDs 112 is widened, the light emitted to the light entering faces 121a and 121b of the light guide plates (the first light guide module 12a and the second light guide module 12b) might be spotty, resulting in luminance unevenness.

To counter this problem, a prism seal 127a may be used as shown in FIG. 13. FIG. 13A is a front view of the light guide plate 12a and the prism seal 127a, and FIG. 13B is an enlarged view of the portions surrounding the light entering face 121a, and the LED bar 11. The prism seal 127a is attached to the light entering face 121a as shown in the drawings, so as to diffuse light on the light entering face 121a. Accordingly, luminance unevenness can be restrained.

Even if the pitch of the LEDs 112 is widened, it is preferable to illuminate the center of the liquid crystal panel 1 as brightly as possible, because human gazes at the center of the liquid crystal panel 1. Therefore, instead of arranging the LEDs 112 with even intervals, the LEDs 112 may be densely provided by narrowing the pitch at portions located immediately below the center of the liquid crystal panel 1, as shown in FIG. 14.

Alternatively, in a case where the LEDs 112 are arranged with even intervals, high-power LEDs 112 may be used at portions located immediately below the center of the liquid crystal panel 1, as shown in FIG. 15.

Figure 16:
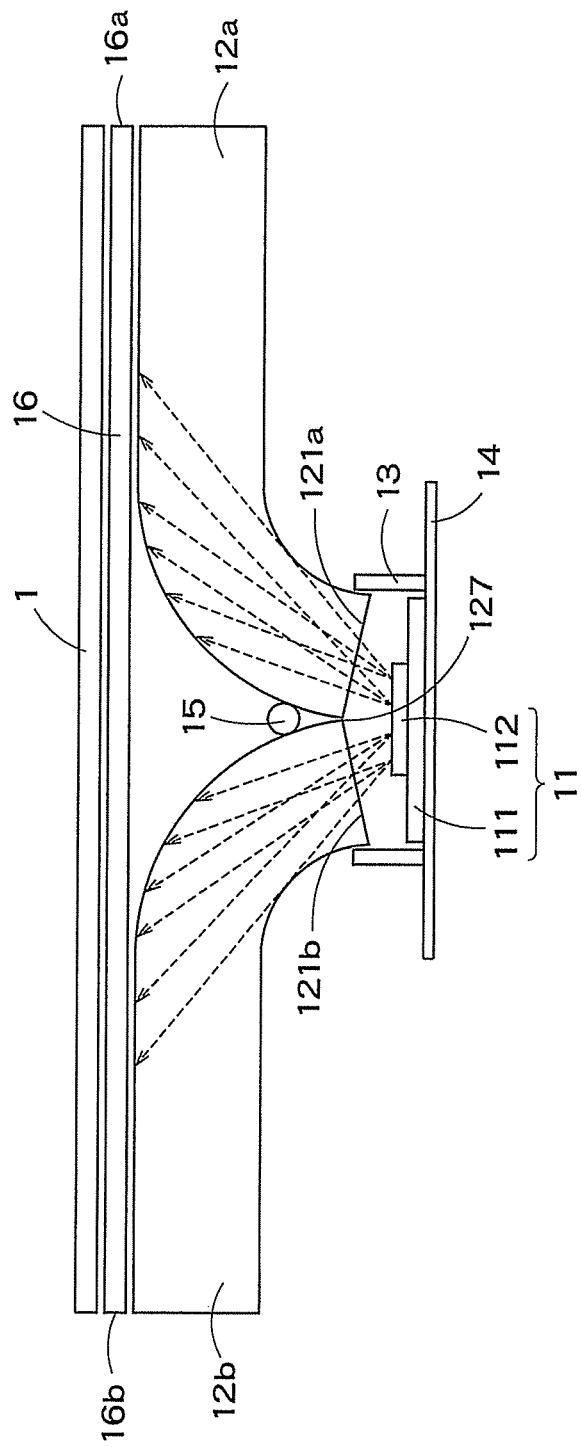
FIG. 16 is a front view of a modified example of FIG. 5.

FIG. 5 shows an example in which the light entering faces 121a and 121b are horizontal. However, the light entering faces 121a and 121b may be tilted at such angles as to satisfy all the conditions for reflection, as shown in FIG. 16.

More specifically, the sides of the light entering faces 121a and 121b closer to the center of the liquid crystal panel 1 are tilted toward the liquid crystal panel 1, and the sides of the light entering faces 121a and 121b closer to the rims of the liquid crystal panel 1 are tilted in directions away from the liquid crystal panel 1. Accordingly, the incidence efficiency of the light emitted by the LEDs 112 can be increased.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The following forms can be considered, for example.

EX 1. A backlight device comprising:
an optical controller (16);
a light source (112) facing the optical controller (16);
first and second light guide modules (12a, 12b) configured to guide light emitted by the light source (112) toward the optical controller (16); and
a first member (15) placed in a traveling path of the light emitted by the light source (112), the first member (15) being located near a joining portion (127) at which the first light guide module (12a) and the second light guide module (12b) are joined to each other.

EX 2. The backlight device of EX. 1, wherein
the first light guide module (12a) has a curved shape to deflect light entering a light entering face toward a first rim (16a) along the optical controller (16), and
the second light guide module (12b) has a curved shape to deflect light entering a light entering face toward a second rim (16b) along the optical controller (16), the second rim (16b) facing the first rim (16a).

EX 3. The backlight device of EX 2, wherein the light source (112) includes a plurality of light sources (112) arranged in a direction substantially parallel to the first rim (16a).

EX 4. The backlight device of EX 3, wherein the plurality of light sources (112) are arranged with a higher density in a region near a center of the optical controller (16) than in a region far from the center.

EX 5. The backlight device of EX 3, wherein, among the plurality of light sources (112), light sources (112) located in a region near a center of the optical controller (16) have higher optical outputs than light sources (112) located in a region far from the center.

EX 6. The backlight device of EX 3, wherein
the plurality of light sources (112) are arranged in one line in a direction substantially parallel to the first rim (16a), and
light emitted by the plurality of light sources (112) evenly enters the first light guide module (12a) and the second light guide module (12b).

EX 7. The backlight device of EX 3, wherein
some of the light sources (112) are arranged in one line in a first direction substantially parallel to the first rim (16a), the some of the light sources (112) being positioned to face the light entering face (121a) of the first light guide module (12a),
other of the light sources (112) are arranged in one line in a second direction substantially parallel to the first rim (16a), the other of the light sources (112) being positioned to face the light entering face (121b) of the second light guide module (12b), and
the light sources (112) facing the light entering face (121a) of the first light guide module (12a) are arranged in a staggered manner with respect to the light sources (112) facing the light entering face (121b) of the second light guide module (12b).

EX 8. The backlight device of EX 2, wherein
the light entering face (121a) of the first light guide module (12a) is tilted away from the optical controller (16) at a portion closer to the first rim (16a), and
the light entering face (121b) of the second light guide module (12b) is tilted away from the optical controller (16) at a portion closer to the second rim (16b).

EX 9. The backlight device of EX 1, wherein the first member (15) is configured to reduce the light emitted by the light source (112) and reaching the optical controller (16) without passing through the first light guide module (12a) and the second light guide module (12b).

EX 10. The backlight device of EX 1, wherein
scattering portions (126a) are formed at portions of the first light guide module (12a) and the second light guide module (12b), the scattering portions being configured to scatter light, and
color of a surface of the first member (15) is identical to color of the scattering portions (126a).

EX 11. The backlight device of EX 1, wherein the light source (112) is positioned to face a region including a center of the optical controller (16).

EX 12. A display comprising:
a display panel (1); and
the backlight device of claim 1 configured to emit light to the display panel (1).

EX 13. The display of EX 12 further comprising a tuner (145, 150) configured to receive and tune a broadcast wave,
wherein the display panel (1) is configured to display the tuned broadcast wave.

EX 14. A backlight device comprising:
an optical controller (16);
a plurality of first light sources (112a) facing the optical controller (16);
a first light guide module (12a) configured to guide light emitted by the plurality of first light sources (112) toward the optical controller (16);
a plurality of second light sources (112b) facing the optical controller (16); and
a second light guide module (12b) configured to guide light emitted by the plurality of second light sources (112b) toward the optical controller (16),
wherein the plurality of first light sources (112a) and the plurality of second light sources (112b) are located at a higher density in a region near a center of the optical controller (16) than in a region farther away from the center.

EX 15. The backlight device of EX 14, wherein
the first light guide module (12a) has a curved shape to deflect light entering a light entering face (121a) toward a first rim (16a) along the optical controller (16), and
the second light guide module (12b) has a curved shape to deflect light entering a light entering face (121b) toward a second rim (16b) along the optical controller (16), the second rim (16b) facing the first rim (16a).

EX 16. The backlight device of EX 15, wherein
the light entering face (121a) of the first light guide module (12a) is tilted away from the optical controller (16) at a portion closer to the first rim (16a), and
the light entering face (121b) of the second light guide module (12b) is tilted away from the optical controller (16) at a portion closer to the second rim (16b).

EX 17. The backlight device of EX 14, wherein the plurality of first light sources (112a) and the plurality of second light sources (112b) are located to face a region including a center of the optical controller (16).

EX 18. A display comprising:
a display panel (1); and
the backlight device of claim 1 configured to emit light to the display panel (1).

EX 19. The display of EX 18 further comprising a tuner (145, 150) configured to receive and tune a broadcast wave,
wherein the display panel is configured to display the tuned broadcast wave.

The invention claimed is:

1. A backlight device comprising:
an optical controller;
a light source facing the optical controller;
first and second light guide modules configured to guide light emitted by the light source toward the optical controller; and
a first member placed in a traveling path of the light emitted by the light source, the first member being located near a joining portion at which the first light guide module and the second light guide module are joined to each other,
wherein the first light guide module has a curved shape to deflect light entering a light entering face toward a first rim along the optical controller,
the second light guide module has a curved shape to deflect light entering a light entering face toward a second rim along the optical controller, the second rim facing the first rim,
the light source includes a plurality of light sources arranged in a direction substantially parallel to the first rim, and
the plurality of light sources are arranged with a higher density in a region near a center of the optical controller than in a region far from the center.

2. The backlight device of claim 1, wherein
the plurality of light sources are arranged in one line in a direction substantially parallel to the first rim, and
light emitted by the plurality of light sources evenly enters the first light guide module and the second light guide module.

3. The backlight device of claim 1, wherein the first member is configured to reduce the light emitted by the light source and reaching the optical controller without passing through the first light guide module and the second light guide module.

4. The backlight device of claim 1, wherein
scattering portions are formed at portions of the first light guide module and the second light guide module, the scattering portions being configured to scatter light, and
color of a surface of the first member is identical to color of the scattering portions.

5. The backlight device of claim 1, wherein the light source is positioned to face a region including a center of the optical controller.

6. A display comprising:
a display panel; and
the backlight device of claim 1 configured to emit light to the display panel.

7. The display of claim 6 further comprising a tuner configured to receive and tune a broadcast wave,
wherein the display panel is configured to display the tuned broadcast wave.

8. A backlight device, comprising:
an optical controller;
a light source facing the optical controller;
first and second light guide modules configured to guide light emitted by the light source toward the optical controller; and
a first member placed in a traveling path of the light emitted by the light source, the first member being located near a joining portion at which the first light guide module and the second light guide module are joined to each other,
wherein the first light guide module has a curved shape to deflect light entering a light entering face toward a first rim along the optical controller,
the second light guide module has a curved shape to deflect light entering a light entering face toward a second rim along the optical controller, the second rim facing the first rim,
the light source includes a plurality of light sources arranged in a direction substantially parallel to the first rim, and
among the plurality of light sources, light sources located in a region near a center of the optical controller have higher optical outputs than light sources located in a region far from the center.

9. A backlight device comprising:
an optical controller;
a light source facing the optical controller;
first and second light guide modules configured to guide light emitted by the light source toward the optical controller; and
a first member placed in a traveling path of the light emitted by the light source, the first member being located near a joining portion at which the first light guide module and the second light guide module are joined to each other,
wherein the first light guide module has a curved shape to deflect light entering a light entering face toward a first rim along the optical controller,
the second light guide module has a curved shape to deflect light entering a light entering face toward a second rim along the optical controller, the second rim facing the first rim,
the light source includes a plurality of light sources arranged in a direction substantially parallel to the first rim,
some of the light sources are arranged in one line in a first direction substantially parallel to the first rim, the some of the light sources being positioned to face the light entering face of the first light guide module,
other of the light sources are arranged in one line in a second direction substantially parallel to the first rim, the other of the light sources being positioned to face the light entering face of the second light guide module, and
the light sources facing the light entering face of the first light guide module are arranged in a staggered manner with respect to the light sources facing the light entering face of the second light guide module.

10. A backlight device comprising:
an optical controller;
a light source facing the optical controller;
first and second light guide modules configured to guide light emitted by the light source toward the optical controller; and
a first member placed in a traveling path of the light emitted by the light source, the first member being located near a joining portion at which the first light guide module and the second light guide module are joined to each other,
wherein the first light guide module has a curved shape to deflect light entering a light entering face toward a first rim along the optical controller, and the light entering face of the first light guide module is tilted away from the optical controller at a portion closer to the first rim, and the light entering face of the second light guide module is tilted away from the optical controller at a portion closer to the second rim.

11. A display comprising:

a display panel; and the backlight device configured to emit light to the display panel, the backlight device comprises an optical controller;

a light source facing the optical controller;

first and second light guide modules configured to guide light emitted by the light source toward the optical controller; and a first member placed in a traveling path of the light emitted by the light source, the first member being located near a joining portion at which the first light guide module and the second light guide module are joined to each other, wherein the first light guide module has a curved shape to deflect light entering a light entering face toward a first rim along the optical controller, the second light guide module has a curved shape to deflect light entering a light entering face toward a second rim along the optical controller, the second rim facing the first rim, the light source includes a plurality of light sources arranged in a direction substantially parallel to the first rim, and the plurality of light sources are arranged with a higher density in a region near a center of the optical controller than in a region far from the center.

12. The display of claim 11 further comprising a tuner configured to receive and tune a broadcast wave, wherein the display panel is configured to display the tuned broadcast wave.

13. A backlight device comprising:

an optical controller;

a plurality of first light sources facing the optical controller;

a first light guide module configured to guide light emitted by the plurality of first light sources toward the optical controller;

a plurality of second light sources facing the optical controller; and a second light guide module configured to guide light emitted by the plurality of second light sources toward the optical controller, wherein the plurality of first light sources and the plurality of second light sources are located at a higher density in a region near a center of the optical controller than in a region farther away from the center.

14. The backlight device of claim 13, wherein the first light guide module has a curved shape to deflect light entering a light entering face toward a first rim along the optical controller, and the second light guide module has a curved shape to deflect light entering a light entering face toward a second rim along the optical controller, the second rim facing the first rim.

15. The backlight device of claim 14, wherein the light entering face of the first light guide module is tilted away from the optical controller at a portion closer to the first rim, and the light entering face of the second light guide module is tilted away from the optical controller at a portion closer to the second rim.

16. The backlight device of claim 13, wherein the plurality of first light sources and the plurality of second light sources are located to face a region including a center of the optical controller.

* * * * *